United States Patent Office 2,962,395
Patented Nov. 29, 1960

2,962,395

PAINT STRIPPING METHOD AND COMPOSITION

Lewis J. Brown, North Wales, Pa., assignor to Pennsalt Chemicals Corporation, a corporation of Pennsylvania No Drawing. Filed Nov. 9, 1956, Ser. No. 621,191

12 Claims. (Cl. 134—38)

This invention relates to the removal of decorative or protective organic coatings from surfaces, and more particularly to removal of such coatings by the alkaline soak stripping technique.

Alkaline soak stripping is the method commonly used where a large amount of paint must be removed or where a large number of articles must be processed, particularly on assembly lines for the manufacture, repair or reconditioning of metal articles where a heavy duty, continuously operating paint remover is needed. The painted articles are immersed in an alkaline solution which is usually operated at or near boiling temperatures. The paint is softened, loosened or dissolved by this solution to an extent at least sufficient to permit its complete removal by subsequently flushing the surface with water. Depending principally on the composition of the paint, the soaking time required may vary from a few minutes to several hours, though on assembly lines periods of greater than ten minutes are considered impractical.

Because of the great improvement in the durability and adhesion of paints in recent years the removal of paint has become proportionately more difficult, particularly by chemical means. Many paints now on the market are virtually impervious to the attack of alkalies, acids, organic solvents or other corrosive media. Indeed the epoxy resin base paints, for example, are used as corrosion-resistant coatings in the chemical industry, while other types of paint, such as the chlorinated rubber base paints and the alkyd paints, are also noted for their high degree of resistance to chemical corrosion. Paints such as these either resist entirely the action of alkaline soak stripping baths or else require such prolonged treatment in the bath as to render this method of removal extremely cumbersome.

It has now been discovered that by the addition to the alkaline stripping solution of a gluconate and an alkyl aryl sulfonate, as hereinafter more fully described, the effectiveness of the solution is greatly enhanced, the resulting composition being capable of rapidly removing even the most stubbornly adhesive paints.

The effectiveness of the paint stripping composition and method of this invention, and the interdependence of the components, is well illustrated in the following table:

TABLE I

*Stripping epoxy resin base paint from steel*

| Make-up of Alkaline Soak Stripper [1] | Description of Action |
|---|---|
| (1) Caustic soda (3 lb./gal.) | Paint slightly softened. |
| (2) (1) plus 0.1 lb./gal. sodium gluconate. | Paint slightly softened. |
| (3) (1) plus 0.3 lb./gal. sodium xylene sulfonate. | Paint lifted slightly. |
| (4) (3) plus 0.1 lb./gal. sodium gluconate. | Paint completely stripped off. |

[1] Seven minutes' immersion, solution boiling.

Alkaline soak stripping baths generally consist of a solution having a caustic soda concentration of about 1 lb. to 3 lb. per gallon. Other alkalies besides caustic, such as potassium hydroxide, may also be used, but are generally not preferred due to their relativley higher cost. Concentrations of greater than 3 lbs./gal. caustic soda are sometimes desirable, but again economic factors militate against the higher concentrations. Strengths of less than 1 lb./gal. are also sometimes effective, particularly on the less resistant paints, but in general a concentration of at least 1 lb./gal. caustic is desirable to provide efficient attack on the paint.

With respect to the gluconate additive, this may be added to or otherwise incorporated in the stripping bath in the form of gluconic acid or as the sodium or calcium salt of gluconic acid. In combination with the alkyl aryl sulfonate it is effective in any amount greater than about 1% by weight based on the weight of the alkali. Amounts greater than 5%, while still effective, give no further improvement in stripping action and are moreover obviously more costly. It is preferred that the gluconic acid or its salt be present in the stripping solution in amounts of about 3 to 4% of the weight of alkali.

With regard to the alkyl aryl sulfonate, this may be any of the compounds which can be represented by the general formula R—Ar—SO$_3$X wherein Ar is a benzene or naphthalene ring, R is one or more alkyl (including cycloalkyl) groups the total number of carbon atoms in which is between 1 and 5, and SO$_3$X represents sulfonic acid or one of the salts of sulfonic acid. The preferred alkyl aryl sulfonates are those wherein the aryl portion is a benzene ring. A few of the commercially available alkyl aryl sulfonates suitable for use include Naxonate G (trade name for sodium xylene sulfonate made by Wyandotte Chemicals Corp.), Naccosol A (trade name for sodium propyl naphthalene sulfonate made by National Aniline Div., Allied Chemical & Dye Corp.) and Alkanol S Flakes (trade name for sodium tetrahydronaphthalene sulfonate made by E. I. du Pont de Nemours & Co.).

Of these compounds sodium tetrahydronaphthalene sulfonate, which may be considered an alkyl substituted benzene sulfonate (the formula being

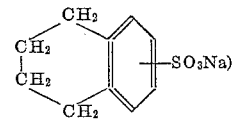

gives exceptionally good performance, particularly in removing the epoxy resin base paints.

The alkyl aryl sulfonate should be present in the stripping solution in an amount of at least about 3 weight percent, based on the weight of the alkali. Preferably it should be present in amounts of between 5 and 10%. Amounts greater than 10%, while still effective, are, again for economic reasons, less preferable.

It has further been discovered that the effectiveness of the above stripping solution is greatly enhanced when there is included therein a glycol ether, as hereinafter defined. This material not only acts to increase the solubility of the alkyl aryl sulfonate in the caustic solution and to prevent its precipitation, but it has moreover a curious and surprising effect over and above this solubilizing action, in that it intensifies and accelerates the stripping mechanism of the composition as a whole. This is particularly surprising in view of the fact that the glycol ether is itself only slightly miscible with the caustic solution, the entire composition being essentially diphasic at operating temperatures.

Glycol ethers which are suitable additives for enhancing the effectiveness of the compositions of this invention can be represented by the general formula R—O—(CH$_2$CH$_2$O)$_n$—H wherein R is an alkyl group containing 1 to 4 carbon atoms and $n$ is from 2 to 3.

"Carbitol" solvent $(C_2H_5-O-(C_2H_4O)_2-H)$, made by Union Carbide and Carbon Corp. is an example of this type of compound, as are "Butyl Carbitol"

$$(C_4H_9O-(C_2H_4O)_2-H)$$

and methoxytriglycol $(CH_3O-(C_2H_4O)_3-H)$. In general, members of this group which have a high flash point and a low volatility at the boiling temperature of the caustic solution are to be preferred. A compound having all these advantages is ethoxytriglycol, $$C_2H_5O-(C_2H_4O)_3-H$$

The glycol ether, when included in the paint stripping composition, should be present in an amount of 5 to 20 weight percent based on the weight of the alkali, and preferably in an amount of 10 to 15%.

In practicing the present invention, the components of the paint stripping composition are dispersed in water, normally in a soak tank, and the solution or dispersion is then heated to at least about 180° F. Preferably the solution is maintained at a rapid boil. The painted article is immersed in the hot solution and allowed to soak therein until the attack on the paint is effected. The manner in which the solution attacks the paint may vary considerably, depending principally on the chemical nature of the paint itself and on the nature of the priming or undercoat as well. Sometimes the paint is lifted away from the surface in sheets, sometimes it is blistered and peeled off and sometimes it is actually dissolved. This action may take as long as ten minutes, but usually it is complete within from 3 to 6 minutes. Occasionally a particularly stubborn type of paint may take a few minutes longer.

It is sometimes desirable to complete the stripping action by following the soak treatment with a flushing rinse, for example with a strong water spray, rather than to wait for the paint to be completely removed in the soak tank. This modification generally speeds up the operation and tends to lengthen the working life of the solution as well.

A particular advantage of the paint stripping composition of this invention is that it is adaptable to packaging as a dry granular product, for ease and economy in shipping and storing. When this is done, the proportions of the components should be within the following ranges:

| Component: | Percent by weight |
|---|---|
| Alkali | 50-96 |
| Gluconate | 1-5 |
| Alkyl aryl sulfonate | 3-10 |
| Glycol ether (optional) | 5-20 |

If the glycol ether, which is a liquid at ambient temperatures, is included in the dry product, it is preferable also to blend in about 5 to 15% soda ash to prevent caking.

When the solid product is used, it is dispersed in water in amounts of about ½ to 4 lb./gal., and preferably 1 to 3 lb./gal.

The following examples will serve to illustrate the present invention, but are not to be construed as limiting the scope thereof.

EXAMPLE I

| | Percent by weight |
|---|---|
| Caustic soda | 92.2 |
| Sodium gluconate | 3.2 |
| Alkanol S Flakes (as defined) | 4.6 |

This composition, in the form of a dry, granular preparation, was charged into a paint stripping tank at 2 pounds of the composition per gallon of water. The resulting solution was brought to a rapid boil. Steel coated with a modified epoxy resin paint was immersed in this solution. The paint was completely stripped from the steel within 8 minutes, leaving a clean, film-free surface. A simple water rinse to remove entrained alkali completed the operation.

EXAMPLE II

To the solution of Example I was added 15% by weight Carbitol (defined hereinabove). At boiling, this solution separated into two liquid phases. It stripped paint similar to that of Example I in less than 6 minutes.

EXAMPLE III

| | Percent by weight |
|---|---|
| Caustic soda | 88.0 |
| Sodium gluconate | 3.2 |
| Naccosol A (as defined) | 8.8 |

This composition, charged at 2 lb./gal., stripped the same modified epoxy resin paint in about 6.5 minutes.

EXAMPLE IV

| | Percent by weight |
|---|---|
| Caustic soda | 88.0 |
| Sodium gluconate | 3.2 |
| Naccosol A (as defined) | 8.8 |

This composition, charged at 3 lb./gal., stripped modified epoxy resin paint from steel in 5 minutes and stripped an alkyd paint from steel in about 15 minutes.

EXAMPLE V

Test panels of steel coated with (1) a modified epoxy resin stove paint, (2) an alkyd refrigerator paint system (with undercoat), and (3) an epoxy resin refrigerator paint (with undercoat) were immersed in stripping solutions having the following compositions (3 lb./gal.):

| | Solution A, wt. percent | Solution B, wt. percent | Solution C, wt. percent |
|---|---|---|---|
| Caustic soda | 72 | 72 | 72 |
| Soda ash | 11.0 | 11.0 | 11.0 |
| "Alkanol S Flakes" | | 4.5 | 4.5 |
| Sodium gluconate | 2.5 | 2.5 | 2.5 |
| Ethoxytriglycol | | 10 | |
| "Carbitol" | 10 | | 10 |
| "Naccosol A" | 4.5 | | |

The results were as follows:

| Solution | Test Panel | | |
|---|---|---|---|
| | 1. | 2. | 3. |
| A | Blistered in 1 min.; stripped in 3.5 min. | Almost completely stripped in 10 min. | Stripped completely in 2 min. |
| B | Stripped in 3 min. | do | Blistered in 1 min.; stripped in 10 min. |
| C | Blistered in 1 min.; stripped in 2 min. | do | Blistered in 1 min.; stripped in 4 min. |

It should be understood that the term "paint" as used herein throughout the specification and claims is intended to include organic surface coatings generally, a class which embraces the lacquers, enamels, drying oil base paints, etc., in addition to those paints specifically mentioned hereinabove.

In general the alkaline soak stripping technique is restricted to the removal of paint from surfaces that are not subject to attack by the alkali. Thus, while the stripping solution and method of this invention is effective in removing paint from any type of surface, it is generally preferred to treat only iron and steel or other alkali resistant surfaces in this manner, since surfaces such as glass, wood or the light metals may be injured by the alkali.

Having described my invention, I claim:

1. A method of removing paint from alkali-resistant surfaces comprising subjecting said surfaces to an aqueous alkaline solution which contains a gluconate and an alkyl aryl sulfonate having the formula R—Ar—SO$_3$X wherein R is at least one alkyl group having a total number of carbon atoms of from 1 to 5, Ar is an aryl group of the group consisting of benzene and naphthalene groups and SO₃X is one of the group consisting of sulfonic acid and its salts.

2. A method of removing paint from alkali-resistant surfaces comprising subjecting said surfaces to an aqueous solution which contains 1 to 3 pounds of caustic soda per gallon, a gluconate of the group consisting of gluconic acid, sodium gluconate and calcium gluconate, and an alkyl aryl sulfonate having the formula R—Ar—SO₃X wherein R is at least one alkyl group having a total number of carbon atoms of from 1 to 5, Ar is an aryl group of the group consisting of benzene and naphthalene groups and SO₃X is one of the group consisting of sulfonic acid and its salts, said gluconate and said sulfonate being present in amounts of 1 to 5% and 3 to 10% by weight respectively, based on the weight of the caustic soda.

3. The method of claim 2 wherein said solution has a temperature of at least about 180° F.

4. A method of removing paint from an alkali-resistant surface comprising immersing said surface in an aqueous paint stripping solution having a temperature of 180° F. to boiling, continuing the immersion until the paint is substantially loosened and then removing the loosened paint by directing a rapid stream of water thereon, said solution containing 1 to 3 pounds of caustic soda per gallon, a gluconate of the group consisting of gluconic acid, sodium gluconate and calcium gluconate, and an alkyl aryl sulfonate having the formula

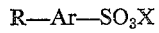

wherein R is at least one alkyl group having a total number of carbon atoms of from 1 to 5, Ar is an aryl group of the group consisting of benzene and naphthalene groups and SO₃X is one of the group consisting of sulfonic acid and its salts, said gluconate and said alkyl aryl sulfonate being present in amounts of 1 to 5% and 3 to 10% by weight respectively, based on the weight of the caustic soda.

5. The method of claim 4 wherein said gluconate is sodium gluconate and said alkyl aryl sulfonate is sodium tetrahydronaphthalene sulfonate.

6. The method of claim 4 wherein said solution contains a glycol ether having the formula

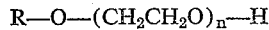

wherein R is an alkyl group containing 1 to 4 carbon atoms and n is from 2 to 3, said glycol ether being present in an amount of 5 to 20% by weight based on the weight of the caustic.

7. A paint stripping composition for use in aqueous solution consisting essentially of 50 to 96 weight percent caustic soda, 1 to 5 weight percent of a gluconate of the group consisting of gluconic acid, sodium gluconate and calcium gluconate, 3 to 10 weight percent alkyl aryl sulfonate having the formula R—Ar—SO₃X wherein R is at least one alkyl group having a total number of carbon atoms of from 1 to 5, Ar is an aryl group of the group consisting of benzene and naphthalene groups and SO₃X is one of the group consisting of sulfonic acid and its salts, and 5 to 20 weight percent glycol ether having the formula R—O—(CH₂CH₂O)ₙ—H wherein R is an alkyl group containing 1 to 4 carbon atoms and n is from 2 to 3.

8. A paint stripping composition for use in aqueous solution consisting predominantly of 50–96% by weight of a caustic alkali, and minor amounts of a gluconate and an alkyl aryl sulfonate having the formula R—Ar—SO₃X wherein R is at least one alkyl group having a total number of carbon atoms of from 1–5, Ar is an aryl group of the group consisting of benzene and naphthalene groups and SO₃X is one of the group consisting of sulfonic acid and its salts.

9. A paint stripping composition for use in aqueous solution consisting predominantly of 50–96% by weight of a caustic alkali, 1–5% by weight of a gluconate, and from 3–10% by weight of an alkyl aryl sulfonate having the formula R—Ar—SO₃X, wherein R is at least one alkyl group having a total number of carbon atoms of 1–5, Ar is an aryl group consisting of benzene and naphthalene groups and SO₃X is one of a group consisting of sulfonic acid and its salts.

10. An aqueous paint stripping solution containing from ½ to 4 pounds per gallon of a caustic alkali and in addition small amounts of a gluconate, an alkyl aryl sulfonate having the formula R—Ar—SO₃X, wherein R is at least one alkyl group having a total number of carbon atoms of from 1–5, Ar is an aryl group of the group consisting of benzene and naphthalene groups and SO₃X is one of the group consisting of sulfonic acid and its salts, and a glycol ether.

11. A paint stripping solution in accordance with claim 10 in which said gluconate is present in a concentration of 1–5%, said alkyl aryl sulfonate in a concentration of 3–10% and said glycol ether in a concentration of 5–20%, all said concentrations being expressed as weight percent based on the weight of caustic alkali in said solution.

12. A paint stripping solution in accordance with claim 11 in which said glycol ether is a compound having the formula R—O—(CH₂CH₂O)ₙ—H wherein R is an alkyl group containing 1–4 carbon atoms and n is an integer from 2–3.

References Cited in the file of this patent

UNITED STATES PATENTS

| | | |
|---|---|---|
| 1,525,373 | Cleveland | Feb. 3, 1925 |
| 2,509,197 | Borus et al. | May 30, 1950 |
| 2,566,298 | Irwin | Sept. 4, 1951 |
| 2,584,017 | Dvorkovitz et al. | Jan. 29, 1952 |
| 2,615,846 | Dvorkovitz et al. | Oct. 28, 1952 |
| 2,650,875 | Dvorkovitz | Sept. 1, 1953 |
| 2,653,860 | Meyer | Sept. 29, 1953 |
| 2,653,861 | Meyer | Sept. 29, 1953 |
| 2,710,843 | Stebleton | June 14, 1955 |

OTHER REFERENCES

"Chemical Trade Names and Commercial Synonyms," 1955, D. Van Nostrand Co., Inc., Princeton, N.J., page 56.

"Condensed Chemical Dictionary," 1950; Reinhold Publishing Corp., N.Y.C., N.Y., page 269.